United States Patent Office 3,530,153
Patented Sept. 22, 1970

3,530,153
PROCESS FOR PREPARING N-MONOSUBSTITUTED SECONDARY-ALKYL AMIDES FROM OLEFINS
Ralph H. Potts, La Grange, and Eugene J. Miller, Jr., Wheaton, Ill., and Ago Mais, Trenton, N.J., assignors, by mesne assignments, to Armour Industrial Chemical Company, a corporation of Delaware
No Drawing. Continuation-in-part of applications Ser. No. 397,287, Sept. 17, 1964, and Ser. No. 644,060, June 7, 1967. This application Aug. 25, 1967, Ser. No. 663,226
Int. Cl. C07c *103/08, 103/34*
The portion of the term of the patent subsequent to Aug. 29, 1984, has been disclaimed
U.S. Cl. 260—404    23 Claims

---

ABSTRACT OF THE DISCLOSURE

Process for preparing aliphatic organic nitrogen compounds by the reaction of an aliphatic olefinic compound with nitrile and water in the presence of hydrogen fluoride to form secondary-alkyl amides.

---

This application is a continuation-in-part of our co-pending applications, Ser. No. 397,287 filed Sept. 17, 1964, now U.S. Pat. 3,338,967 and Ser. No. 644,060, filed June 7, 1967, now abandoned.

This invention relates to a process for amidating olefins with a nitrile and water in a hydrogen fluoride medium resulting in N-monosubstituted secondary-alkyl amides. The amides so produced may be recovered or further converted to the corresponding primary amines. Of particular importance is the process for producing secondary-alkyl primary amines from alpha-olefins. Our invention further relates to the novel class of N-monosubstituted secondary-alkyl amides which can be isolated if desired, and which will readily undergo conversion to a novel class of secondary-alkyl primary amines having unique properties. These amines may be further reacted to form a large number of new amine derivatives.

The process of our invention using hydrogen fluoride as a reaction medium and catalytic agent, is especially favorable in view of economic considerations of commercial production according to our invention. The use of hydrogen fluoride provides special advantages in the simplicity of an efficient and economical recovery system for recycling hydrogen fluoride in a continuous production process plant. Further, the process of our invention carried out in a hydrogen fluoride medium is found to proceed at surprisingly low temperatures with minimal exothermic reaction heat generated providing a reaction system which can be easily controlled.

An object of this invention is to provide a novel process for the production of secondary-alkyl aliphatic organic nitrogen compounds.

A further object is to produce secondary-alkyl primary amides from olefins in a reaction resulting in minimal exothermic conditions and affording efficient, economical recovery of catalyst chemicals following the reaction.

Still another specific object is to effect the high yield amidation of olefins in the presence of hydrogen fluoride to result in N-monosubstituted secondary-alkyl amides which may be isolated, or may be converted to result in a novel class of secondary-alkyl primary amines and other amine derivatives having unique properties.

A further specific object is to effect high yield amidation of alpha-olefins by a nitrile and water in the presence of hydrogen fluoride to result in N-mono-substituted secondary-alkyl amides.

A further object is to provide a process wherein the isomeric composition of the nitrogen attachment to the secondary-alkyl group of the amide products may be controlled according to the order of addition of reactants.

These and other objects of our inventions are accomplished by the process comprising reacting an olefin with a nitrile and water in the presence of hydrogen fluoride to form N-monosubstituted secondary-alkyl amides.

In a specific embodiment, our invention may be exemplified by the following reaction:

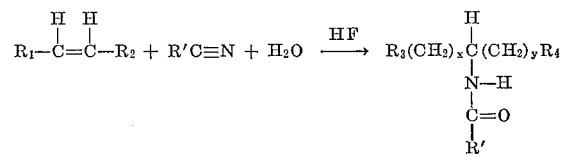

wherein $R_1$ is selected from the group consisting of hydrogen, and an aliphatic hydrocarbon radical, $R_2$ is an aliphatic radical which may be connected to $R_1$ in a cyclic structure, and wherein the total molecule contains from 3 to about 48 carbon atoms; $R'$ is selected from the group consisting of hydrogen, an aliphatic hydrocarbon radical having from 1 to about 21 carbon atoms inclusive, an aryl radical, an amino radical, a cyano radical, and metallic salts of an amino radical; and $x$ and $y$ are integers having a sum from 1 to about 47; and $R_3$ and $R_4$ are radicals derived from the occurrences of $R_1$ and $R_2$ in the olefin reactant.

The aryl and aliphatic hydrocarbon radicals may be substituted wherein the substituted components may be selected from the group consisting of carboxy, cyano, and amino radicals. The amino radical of $R'$, $R_1$ and $R_2$ may be substituted. The aliphatic hydrocarbon radicals may be straight chain, branched chain, cyclic, saturated and unsaturated provided the unsaturation is not conjugated to the olefinic function, and aryl substituted provided the aromatic ring is not conjugated to the olefinic function.

In a preferred subclass, $R_2$ is selected from the group consisting of alkyl $C_{1-22}$, alkyl $C_{1-22}$ substituted with a radical selected from the group consisting of amino, carboxy and cyano, and alkenyl $C_{3-22}$ provided the alkenyl unsaturation is not conjugated with the olefinic function.

One preferred subclass within our invention is the reaction of an alpha olefin; that is where $R_1$ is hydrogen. Also included are alpha, omega-diolefins, as are straight and branched chain and aryl substituted, provided the aromatic group is not conjugated to the olefinic bond.

Another subclass of olefinic reactants is the internal olefin; that is where $R_1$ and $R_2$ are both aliphatic groups. Linear and branched chain groups unsubstituted and those substituted with carboxy, amino and cyano radicals are especially useful.

Polyolefins may be used, especially diolefins.

One subclass within our invention utilizes the reaction wherein the olefinic reactant is a cyclic aliphatic compound. The cyclic olefinic reactant may be shown as

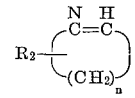

wherein $R_2$ has the same meaning as above and $n$ is an integer from 1 to about 10. There may be several occurrences of $R_2$ in the molecule.

As exemplified above, a large number of olefins and substituted olefins may serve as reactants in the process of this invention. It should be understood that an essential factor of the olefin reactant is the presence of the olefinic bonding in the molecule. Mixtures of olefins may be used. Olefins suitable for reactants in the process of our invention may be obtained from any olefin source, such as from petroleum, either by direct separation or by treatment with heat or catalysts, or by chemical synthesis.

Examples of some suitable olefinic reactants coming within the above definitions include: butene, pentene, hexene, heptene, octene, nonene, decene, hendecene, dodecene, tridecene, tetradecene, hexadecene octadecene, nonadecene, eicosene, oleic acid, undecylenic acid, allylbenzene, 1,7-octadiene, $C_{7-8}$ internal linear olefins, cyclopentene, cyclohexene, alpha-pinene, oleyl amine, oleyl nitrile, and mixed alpha-olefins in fractions such as $C_6$–$C_7$, $C_7$–$C_9$, $C_9$–$C_{11}$, $C_{11}$–$C_{15}$, $C_{15}$–$C_{20}$, $C_{20}$–$C_{48}$, $C_9$–$C_{10}$, $C_{11}$–$C_{14}$, $C_{15}$–$C_{18}$, and $C_{18}$–$C_{20}$.

A wide variety of nitriles within the above formula are especially suitable for the process of this invention, including particularly, aliphatic nitriles having alkyl or alkenyl straight or branched chain groups and having from 2 to 22 carbon atoms such as acetonitrile, acrylonitrile, caprylonitrile,9,(10)-phenylstearylnitrile, and oleylnitrile; aromatic nitriles such as benzonitrile; amino nitriles such as cyanamide; and dinitrile compounds such as cyanogen.

It will be noted from the above definitions of olefins and nitriles that one molecule may contain both cyano and olefinic reactive functions. Polyamides may be formed directly in this manner. When only one species of difunctional reactant is present self-amidation takes place. Different species of difunctional reactants will also function, such as oleylnitrile and acrylonitrile.

The above formulae illustrate the isomeric nature of the amide products. Due to the carbonium ion mechanism, the nitrogen atom of the nitrile may attach to the carbon chain of the olefin not only at carbon sites of the original double bond, but also at carbon sites away from the original double bond. The isomeric composition of the amide product of the process of our invention may be controlled by reaction conditions, thus resulting in a series of novel isomeric compositions capable of producing amines having surprising properties and uses.

The reaction of our invention will proceed under a wide range of proportions of reactants. Where the mole ratio of nitrile to olefin is at least 1 to 1 the reaction stoichiometry is satisfied. An amount of nitrile in excess of the stoichiometric requirement is preferred. The mole ratio of nitrile to olefin from about 1.1 to 1.0 to about 4.0 to 1.0 has been found to be especially satisfactory. Additional nitrile may be used, but due to economic reasons is not desirable. The amount of hydrogen fluoride may be varied over wide ranges. While the hydrogen fluoride does have a catalytic-type effect, it also serves as the reaction medium. The mole ratio of hydrogen fluoride to olefin of greater than about 3 is preferred. The mole ratio of hydrogen fluoride to olefin of from about 8 to 25 has been found to be especially satisfactory. Greater amounts of hydrogen fluoride may be used. To satisfy the reaction stoichiometry the mole ratio of water to olefin must be at least 1.0 to 1.0. An excess of water is preferred. The mole ratio of water to olefin of more than about 10% excess water is preferred. The mole ratio of water to olefin of from about 1.0 to 1.0 to 1.3 to 1.0 has been found to be especially satisfactory.

The reaction may be carried out over a wide range of temperatures. Temperatures from about $-20°$ to $100°$ C. are suitable in the reaction of the olefin. The initial reactant may be introduced into the reactor at temperatures of less than $20°$ C. Preferred temperatures for introduction of the initial reactants into the reactor are from about $0°$ to $-20°$ C. In procedures wherein olefins are added to other reactants already present in the reactor, improved results are obtained when the olefin is introduced into the reactor at temperatures above $19.4°$ C., the boiling point of hydrogen fluoride. The preferred olefin-nitrile-water reaction temperature is from about $25°$ to $60°$ C. Substantially higher reaction temperatures may be used, but excessively higher temperatures may result in undesirable darkening of the intermediate amide.

The reaction will proceed under a wide range of pressure conditions. Pressures ranging from atmospheric to 20 atmospheres are satisfactory. The preferred pressure conditions are from atmospheric to 5 atmospheres. It is possible to use pressures greatly in excess of 20 atmospheres, but excessively higher pressures present the economic diadvantage of expensive pressure equipment.

The reaction is usually complete in from less than 1 minute to several hours. Good yields of amide have been obtained in from about 10 minutes to several hours in a batch reactor, depending upon the particular reactants, agitation, and conditions of the reaction. Good yields of amide have been obtained in a continuous flow liquid system.

The process of our invention may be conducted either batch-wise or continuously. Any suitable apparatus, such as an autoclave or continuous reactor made of or lined with corrosion resistant materials such as silver, stainless steel, copper, Monel, and the like, may be used.

The sequence of addition of reactants is determinative of the isomeric composition of the product obtained. Some nitrile will add to each carbon atom of the olefin structure, excepting the terminal carbon atoms, resulting in a product which is a mixture of isomers. The sequences wherein the olefin is the last reactant added result in a product rich in isomers wherein the point of attachment of the nitrogen atom is removed from the site of the original location of the double bond in the olefin molecule. Thus, with an aliphatic alpha-olefin reactant, the favored point of attachment of the nitrogen group is away from the beta-carbon atom toward the center of the carbon chain. Suitable addition sequences resulting in product isometric compositions rich in isomers having attachment of the nitrogen group away from the site of the original olefinic bond include: addition of hydrogen fluoride, water and nitrile to a reactor and then addition of the olefin to the reactor; addition of hydrogen fluoride to a reactor, then the addition of nitrile and water followed by the addition of olefin; and other combinations wherein the olefin is the last reactant added.

In sequences of addition wherein the olefin is among the first reactants added to the reactor, or at least added prior to the last reactants, or sequences wherein the addition of reactants is stepwise and the olefin is added prior to the last reactant, the reaction product is rich in isomers wherein the point of attachment of the nitrogen atom is at and adjacent to the site of the original location of the double bond in the olefin molecule. Thus in the alpha-olefin, the favored point of attachment of the nitrogen group is at and adjacent to the beta-carbon atom. Suitable addition sequences resulting in product isomer compositions rich in attachment of the nitrogen group at and adjacent to the site of the original olefinic bond include: addition of the olefin and nitrile to the reactor followed by the addition of hydrogen fluoride and water; stepwise individual addition in the order hydrogen fluoride, nitrile, olefin, and water; addition of hydrogen fluoride first, then nitrile, and then olefin and water simultaneously; and other sequences wherein the olefin is not the last added reactant.

While the exact isomeric composition of the amide products cannot be ascertained by present analytical methods, development of special chromatographic techniques have permitted us to generally describe our products. The results of chromatographic analysis of products of the process of our invention employing various modes of addition of reactants are shown in the examples which follow the description of our invention. The analyses do reliably show the variations in isomeric composition.

Upon the completion of addition of the reactants, the reaction mixture may be stirred at the desired temperature for sufficient time to result in high yields of amide. Reaction times of from about 10 to about 90 minutes in a batch reactor have been found to be satisfactory depending upon reaction conditions. Of course, the reaction time can vary widely depending upon reaction conditions and reactants. The process is admirably suited to continuous production techniques requiring short residence periods. The preferred olefin reaction temperature is from about 25° to about 60° C. In practice the reaction temperature is easily maintained. Surprisingly, we have found the exothermic heat of reaction, when using hydrogen fluoride according to our invention, to be much less than reactions using other acid catalysts.

The amide may be isolated from the reaction mixture by several techniques. Decomposition by water may be achieved by pouring the entire reaction mixture into a large excess of cold water. The product may then be extracted with ether, the extracts may be washed free of hydrogen fluoride, and the ether removed in vacuo. Another amide isolation technique which may be used is decomposition by heat wherein the excess hydrogen fluoride in the reaction mixture is driven off by heating to about 150°–160° C. with stirring. Decomposition by heat is especially well suited to production process methods. Further, the hydrogen fluoride driven from the reaction mixture by heat may be easily condensed for re-use. It must be realized that any effective method of isolating the amide from the reaction mixture may be used.

The N-monosubstituted secondary-alkyl amides produced according to our invention form a novel class of amides which we have found to be especially useful as intermediates in the preparation of a novel class of secondary-alkyl primary amines.

The process of our invention is especially effective in high yield preparation of compositions of isomers of N-monosubstituted secondary-alkyl amides from alpha-olefins. Theoretically, an alpha-olefin of $n$ carbon atoms can give rise $$\frac{n}{2}-1$$

isomeric amides when $n$ is an even number, and $$\frac{n}{2}-\frac{1}{2}$$

isomeric forms when $n$ is an odd number. Following the processes of our invention, this proves to be the case. It has been pointed out above, and is clearly shown by the examples, that the isomeric composition of the amide may be varied by different orders of addition of reactants. Thus, it is apparent that a whole spectrum of isomeric composition may be obtained by varying reaction conditions; from compositions rich in nitrogen substitution at and adjacent to the beta position, to compositions rich in nitrogen substitution toward central positions in the molecule. The percentage isomeric distribution of the compositions may be determined within the limits of sensitivity of gas chromatographic analytical techniques.

The secondary-alkyl primary amines produced from amides produced by the process of our invention have surprising physical properties when compared to presently available primary amines having the amino groups at a terminal position. The amines wherein the primary amino group is attached to an interior carbon atom of an organic molecule have surprisingly low melting points and cloud points as shown in Table I.

TABLE I

| Amine | Melting point (°C) | Cloud point (°C) |
|---|---|---|
| $C_7$–$C_9$ secondary-alkyl primary amine | −108 | (¹) |
| 3% hexyl amine | | |
| 90% octyl amine | −13 | |
| 7% decyl amine | | |
| $C_9$–$C_{11}$ secondary-alkyl primary amine | −80 | (¹) |
| 4% octyl amine | | |
| 90% decyl amine | 8 | |
| 6% dodecyl amine | | |
| $C_{11}$–$C_{15}$ secondary-alkyl primary amine | −29 | −29 |
| Coco amine | 12–15 | 14.5 |
| $C_{15}$–$C_{20}$ secondary-alkyl primary amine | 10 | 12 |
| Tallow amine | 33–40 | 38 |

¹ According to ASTM procedures, cloud points below −36° C. are not reported.

The lower melting points and lower cloud points render the N-secondary-alkyl amines particularly useful as additive chemicals to utilize their cationic surface-active properties. These amines have special utility in oil production operations where cationic surface-active properties are necessary in operations at extreme temperature conditions.

Further, the secondary-alkyl primary amines produced according to our invention have excellent reactivity as chemical intermediates for an entire new series of nitrogen derivatives.

The following examples further illustrate the novel process and products of our invention by way of specific embodiments.

EXAMPLE I

A Monel autoclave was charged with 120 gms. (6.0 moles) hydrogen fluoride, 8.65 gms. (0.38 mole) water and 49.2 gms. (1.20 moles) acetonitrile at a temperature of approximately −10° C. The autoclave was closed to the atmosphere, the temperature raised to 40° C., and 33.7 gms. (0.40 mole) 1-hexene was slowly added over a period of about 30 minutes. Stirring was continued for an additional 30 minutes at about 51–55° C. The autoclave was cooled, opened, and the contents poured into 1000 ml. cold water. 1000 ml. of ether was added and the organic phase separated. The ether solution was washed once with salt-water, once with an aqueous potassium carbonate-salt solution, then twice with salt-water, and dried over anhydrous sodium sulphate. The drying agent was filtered off and concentration in vacuo resulted in a 78.1% mass yield of product having the following properties: Percent amide, 98.9, and iodine value 1.30.

Isomer distribution by gas chromatography: Position of amide 2, 52.3%, and position of amide 3, 47.7%.

EXAMPLE II

A Monel autoclave was charged with 50.5 gms. (0.30 mole) 1-dodecene and 37.9 gms. (0.92 mole) actonitrile. The autoclave was closed and a solution of 90 gms. (4.50 moles) hydrogen fluoride and 6.48 gms. (0.36 mole) water at a temperature of 47–51° C. was pumped slowly into the reactor over a period of about 50 minutes. Stirring was continued for an additional 30 minutes while the temperature was maintained at 45–50° C. The autoclave was cooled to 10° C., opened, and the contents poured into 1500 ml. cold water. 1000 ml. of ether was added and the organic phase separated. The ether solution was washed with five salt-water cycles and dried over anhydrous sodium sulphate. Concentration in vacuo resulted in a pale-yellow oil product (88.0% mass yield) having the following properties: Percent amide (N-sec-dodecyl) acetamide), 94.7, and iodine value, 0.45.

Isomer distribution by gas chromatography:

| Position of amide: | Percent |
|---|---|
| 2 | 37.6 |
| 3 | 27.5 |
| 4 | 12.4 |
| 5+ | 22.5 |

EXAMPLE III

A Monel autoclave was charged with 90 gms. (4.5 moles) liquid hydrogen fluoride. The autoclave was closed and the temperature raised to 20° C. Then 37.9 gms. (0.90 mole) acetonitrile was pumped into the reactor over a period of about 12 minutes. After an additional 11 minutes stirring, the temperature was raised to about 45° C. and 50.5 gms. (0.30 mole) 1-dodecene was pumped into the reactor over a period of about 22 minutes. After an additional 11 minutes stirring, 6.48 gms. (0.36 mole) water was pumped into the reaction zone and the entire mixture stirred for an additional 18 minutes. The autoclave was cooled to about 10° C., opened, and the contents poured into cold water. Ether was added and the organic phase separated and washed free of traces of hydrogen fluoride. The ether solution was dried and concentrated to yield a pale yellow oil product (93.8% yield) having the following properties: Monosubstituted amide, 98.6%, and iodine value, 4.2.

Isomer distribution by gas chromatography:

Position of amide: Percent
2 ------------------------------------ 33.8
3 ------------------------------------ 25.5
4 ------------------------------------ 11.1
5+ ----------------------------------- 29.6

EXAMPLE IV

A Monel autoclave was charged with 90 gms. (4.5 moles) liquid hydrogen fluoride, the unit secured, and the temperature raised to 20° C. Then 37.9 gms. (0.90 mole) acetonitrile was pumped into the reactor over a period of about 8 minutes. Following an additional 19 minutes of stirring, the temperature was raised to 45° C. and 50.5 gms. (0.3 mole) 1-dodecene and 6.5 gms. (0.36 mole) water were pumped into the reactor simultaneously over a period of about 20 minutes. Stirring was continued for about 20–25 minutes at 45–50° C., then the reactor cooled to 16° C., opened and the contents poured into cold water. Ether was added, the organic layer separated and washed free of traces of hydrogen fluoride. The organic layer was dried over anhydrous sodium sulphate and concentrated to result in a pale yellow oil (93.5% mass yield) having the following properties: Monosubstituted amide, 83.8%, and iodine value, 3.38.

Isomer distribution by gas chromatography:

Position of amide: Percent
2 ------------------------------------ 31.7
3 ------------------------------------ 26.6
4 ------------------------------------ 8.8
5+ ----------------------------------- 32.9

EXAMPLE V

A Monel autoclave was charged with 50 gm. (2.5 moles) of anhydrous liquid hydrogen fluoride. The autoclave was closed and the temperature raised to 31° C. By employing a dual pump, a solution of 31.3 gm. (0.76 mole) of acetonitrile and 5.4 gm. (0.30 mole) of water from one source and 45 gm. (0.25 mole) of $C_{11}$–$C_{15}$ mixed alpha-olefin from another source, was simultaneously pumped into the autoclave. The $C_{11}$–$C_{15}$ mixed alpha-olefin had the following properties: Molecular weight (average), 179, and iodine value, 152.5.

Molecular weight distribution—
Number of C atoms: Weight, percent
11 ----------------------------------- 15
12 ----------------------------------- 25
13 ----------------------------------- 24
14 ----------------------------------- 25
15 ----------------------------------- 11

The reactants were introduced by pump over a period of about 40 minutes to the reactor which was maintained at a temperature of about 31 to 50° C. Stirring was continued for an additional 24 minutes while the temperature dropped from 50° to 32° C. The autoclave was cooled to 0° C., opened, and the contents poured into 1500 ml. of cold water. 1000 ml. of ether was added and the organic phase was separated and washed free of hydrogen fluoride. The ether solution was dried over anhydrous sodium sulfate. Concentration in vacuo resulted in a 95% yield of product having the following properties: Percent amide, 90.7, and iodine value, 3.7.

Isomer distribution by gas chromatography:

| Position of amide | Percent | | | | |
|---|---|---|---|---|---|
| | $C_{11}$ | $C_{12}$ | $C_{12}$ | $C_{14}$ | $C_{15}$ |
| 2 | 28.8 | 24.7 | 23.0 | 18.3 | 13.3 |
| 3 | 28.2 | 26.6 | 22.7 | 20.0 | 16.5 |
| 4 | 43.0(4+) | 48.7(4+) | 54.3(4+) | 17.6 | 12.6 |
| 5 | | | | 44.1(5+) | 20.5 |
| 6+ | | | | | 37.1 |

EXAMPLE VI

A reactor was charged with 100 gms. (5.0 moles) of anhydrous liquid fluoride at −10° C. A solution of 62.6 gms. (1.53 moles) of acetonitrile and 10.8 gms. (0.60 mole) of water was added with stirring. During this addition, the temperature rose to 20° C. The reactor was closed and 89.5 gms. (0.50 mole) of $C_{11}$–$C_{15}$ alpha-olefin, having properties as described in Example V, was pumped into the stirred reaction mixture at 25 to 40° C. over a period of about 60 minutes. During the addition, pressures up to about 9.5 p.s.i. developed inside the reactor. Stirring was continued for about 100 minutes, during which period the temperature dropped to 20° C. and the pressure to about 2 p.s.i. The reaction mixture was cooled to −10° C., the reactor opened, and the contents poured slowly into 1500 ml. of cold water. 1000 ml. of ether was added, the organic phase separated and washed, dried and concentrated. The resulting product represented a 93.3% yield and had the following properties:

Percent amide—90.7
Nitrogen (percent)—calculated, 5.88; experimental 5.42
Iodine value—calculated, 0.0; experimental 3.9

The N-($C_{11}$–$C_{15}$ sec-alkyl) acetamide was hydrolyzed in alcoholic potassium hydroxide for 8½ hours at 225 to 250° C. and up to 760 p.s.i. pressure. The reaction mixture was added to water and ether extracted resulting in an amine which gave the following isomer distribution within the $C_{13}$ chain by gas chromatography:

Amino position: Percent
2 ------------------------------------ 8.3
3 ------------------------------------ 20.1
4 ------------------------------------ 27.6
5+ ----------------------------------- 44.0

EXAMPLE VII

A reactor was charged with 45.0 gms. (0.25 mole) $C_{11}$–$C_{15}$ alpha-olefin, having properties as described in Example V, and 31.3 gms. (0.76 mole) acetonitrile. The unit was closed and a solution of 75.0 gms. (3.75 moles) hydrogen fluoride and 5.4 gms. (0.30 mole) water was introduced into the reactor at 42–55° C. over a period of about 50 minutes with stirring. Stirring was continued for about 30 minutes, the reaction mixture cooled to about 10° C., poured into cold water, extracted with ether, washed, dried, and concentrated in vacuo yielding a pale yellow oil (98.1% mass yield) having the following properties:

Percent amide—90.2
Iodine value—3.9

Isomer distribution by gas chromatography:

|  | Percent | | | | |
| --- | --- | --- | --- | --- | --- |
|  | $C_{11}$ | $C_{12}$ | $C_{13}$ | $C_{14}$ | $C_{15}$ |
| Position of Amide: | | | | | |
| 2 | 37.4 | 35.9 | 32.0 | 30.1 | 27.7 |
| 3 | 28.8 | 27.5 | 25.3 | 26.1 | 27.2 |
| 4 | 15.6 | 16.8 | 19.8 | 17.1 | 14.0 |
| 5 | 18.2(5+) | 19.8(5+) | 10.4 | 12.4 | 12.7 |
| 6+ |  |  | 12.5 | 14.3 | 18.4 |

EXAMPLE VIII

An autoclave was charged with 54.0 gms. (0.30 mole) $C_{11}$–$C_{15}$ alpha-olefin, having properties as described in Example V, and 37.9 gms. (0.90 mole) acetonitrile. The vessel was closed and a solution of 90.0 gms. (4.50 moles) hydrogen fluoride and 6.48 gms. (0.36 mole) water was continuously introduced into the reaction mixture over a period of about 55 minutes at a temperature of 45–50° C. The reaction was allowed to proceed for an additional 30 minutes at about 50° C. The unit was then cooled to about 10° C., opened, and the contents poured into a stainless steel beaker.

The reaction mixture was heated with stirring over a period of about 30 minutes at 20–160° C., and then for an additional 34 minutes at 80–160° C. At this point, 1.13 moles of hydrogen fluoride per mole of olefin was still present. The mixture was then maintained at 70–200° C. and stirred for an additional 55 minutes. The reaction mixture was then poured into cold water, extracted with ether, washed, dried, and concentrated resulting in a 91.0% mass yield of a dark-brown oil having the following properties:

Percent amide—100 (by infrared analysis and by perchloric acid titration)
Iodine value—1.7

Isomer distribution by gas chromatography:

|  | Percent | | | | |
| --- | --- | --- | --- | --- | --- |
|  | $C_{11}$ | $C_{12}$ | $C_{13}$ | $C_{14}$ | $C_{15}$ |
| Position of amide: | | | | | |
| 2 | 36.1 | 32.4 | 32.9 | 31.0 | 31.3 |
| 3 | 29.1 | 27.6 | 27.1 | 25.1 | 26.9 |
| 4 | 34.8(4+) | 17.6 | 13.9 | 16.4 | 14.5 |
| 5 |  | 22.4(5+) | 26.1(5+) | 8.9 | 10.4 |
| 6+ |  |  |  | 18.6 | 16.9 |

EXAMPLE IX

A Monel autoclave was charged with 60 gms. (3.0 moles) hydrogen fluoride, 4.32 gms. (0.24 mole) water and 24.6 gms. (0.60 mole) acetonitrile at approximately −10° C. The autoclave was closed and temperature raised to about 49° C. Then 50.5 gms. (0.20 mole) 1-octadecene was pumped into the reaction mixture at about 50° C. Stirring was continued for an additional 33 minutes while the temperature was held at about 55° C. The unit was cooled to 5° C., opened, and the contents poured into cold water. The product was ether extracted, washed and dried. Concentration in vacuo produced a white solid (96.5% mass yield) having the following properties:

Percent amide—95.5
Iodine value—2.7

Isomer distribution by gas chromatography:

| Position of amide: | Percent |
| --- | --- |
| 2 | 21.5 |
| 3 | 21.5 |
| 4 | 8.9 |
| 5+ | 48.1 |

EXAMPLE X

Alpha-olefin, $C_{20+}$ fraction having the following properties was used in this preparation:

| Olefin type | Percent by mole | Carbon No. | Percent by wt. |
| --- | --- | --- | --- |
| RCH=CHR trans | 2.4 | $C_{20}$ | 20.3 |
| RCH=CH$_2$ | 60.8 | $C_{22}$ | 16.7 |
| R$_2$C=CH$_2$ | 13.8 | $C_{24}$ | 13.7 |
| R$_2$C=CHR | 13.3 | $C_{26}$ | 10.9 |
| RCH=CHR cis | 9.7 | $C_{28}$ | 8.5 |
|  |  | $C_{30}$ | 6.9 |
|  |  | $C_{32}$ | 5.6 |
|  |  | $C_{34}$ | 4.4 |
|  |  | $C_{36}$ | 3.4 |
|  |  | $C_{38}$ | 2.7 |
|  |  | $C_{40}$ | 2.1 |
|  |  | $C_{42}$ | 1.7 |
|  |  | $C_{44}$ | 1.3 |
|  |  | $C_{46}$ | 0.8 |

Iodine Value 56.6   Apparent Molecular Weight 448

A reactor was charged with 33.6 gms. (0.075 mole) of the above described $C_{20+}$ alpha-olefin and 12.3 gms. (0.3 mole) acetonitrile. The reactor was closed and the temperature raised to about 50° C. Then 45 gms. (2.25 moles) liquid hydrogen fluoride containing 2 gms. (0.11 mole) water was added to the reactor over a period of about 25 minutes. Stirring was continued for about 60 minutes at 55–60° C. The reactor was cooled to 15° C., opened, and the contents added to water. The product was extracted with methylene chloride, and the extract washed, dried and concentrated in vacuo to give a 92% mass yield of a brown solid having the following properties:

Monosubstituted amide—82.7%
Iodine value—1.96

EXAMPLE XI

A 300 ml. stirred Monel autoclave was charged with 120 gms. (6.0 moles) of liquid hydrogen fluoride, 8.65 gms. (0.48 mole) of water and 49.2 gms. (1.2 mole) of acetonitrile at about 0° C. The autoclave was closed and the temperature raised to 50° C. Mixed hexenes [1] (33.7 gms., 0.4 mole) were pumped in over a period of 26 minutes at 45–50° C. Stirring was continued for an additional 30 minutes at 45–55° C. The unit was cooled to about 0° C. and opened. The reaction mixture was poured into 1000 ml. of cold water. Ether (1000 ml.) was added and the acidic aqueous layer was separated. The ether solution was washed twice with saline solution, twice with dilute potassium hydroxide, and twice again with saline solution. The ether solution was dried over anhydrous sodium sulfate and stripped under reduced pressure to yield 41.9 gms. (73.2% crude mass yield) of pale yellow oil.

Titrimetric analysis:
   Monosubstituted amide—89%
   Iodine value—3.03
GLPC analysis:
   Amide—91.9%
   Olefin—8.1

EXAMPLE XII

A 300 ml. stirred, Monel autoclave was charged with 120 gms. (6.0 moles) of liquid hydrogen fluoride, 8.65 gms. (0.48 mole) of water and 49.2 gms. (1.2 moles) of acetonitrile at 0° C. Allybenzene (47.4 gms., 0.4 mole) was added over a 30 minute period at 50–55° C. Stirring

---

[1] Mixed hexenes from California Chemical Company.
Composition, weight percent:
```
4-methylpentene-1 _____ 40.4
4-methylpentene-2 _____ *25.3
2-methylpentene-1 _____  0.6
1-hexene _____ 30.3
2-ethylbutene-1 _____  0.2
Trans-3-hexene _____  2.3
2-methylpentene-2 _____  0.7
Trans-3-methylpentene-2 _____  0.2
```
*Cis-trans ratio of 16/84.

was continued for 30 minutes at 50–55° C. The unit was then cooled to about 0° C., and opened. The reaction mixture was worked up as in Example XI to yield 48.4 gms. (68.3% crude mass yield) of amber, viscous liquid.

Analysis:
 Titrimetric monosubstituted amide—52%
 Iodine value—16.3

EXAMPLE XIII

A 300 ml. stirred Monel autoclave was charged with 90.0 gms. (4.5 moles) of liquid hydrogen fluoride, 6.48 gms. (0.36 mole) of water and 36.9 gms. (0.9 mole) of acetonitrile at 0–5° C. The autoclave was closed and the temperature raised to 50° C. Undecylenic acid (55.3 gms., 0.3 mole) was added over a 23-minute period at 47–50° C. Stirring was continued for an additional 30 minutes at 45–50° C. The unit was then cooled to 0–10° C., opened, and the reaction mixture poured into 1000 ml. of cold water. Ether (1000 ml.) was added and the acidic aqueous layer separated. The ether layer was washed eleven times with salt solution, dried over anhydrous sodium sulfate, and stripped under reduced pressure to yield 69.0 gms. (94.7% crude mass yield) of a viscous amber oil.

Analysis:
 Titrimetric monosubstituted amide—58.8%
 Iodine value—3.13
 Neutralization equivalent 247 (calc. 243)
GLPC analysis:
 Amide—83.6%
 Other—16.4%

EXAMPLE XIV

A 300 ml. stirred Monel autoclave was charged with 120.0 gms. (6.0 moles) of liquid hydrogen fluoride, 49.2 gms. (1.2 mole) of acetonitrile, and 8.65 gms. (0.48 mole) of water at about 0° C. The autoclave was closed and the temperature raised to 50° C. Cyclopentene (27.25 gms., 0.4 mole) was added over a 40 minute period at 50–55° C. Stirring was continued for an additional 30 minutes at 50–55° C. The unit was then cooled to about 0° C. and opened. The reaction mixture was worked up as in Example XI to yield 34.6 gms. (67.9% crude mass yield) of yellow oil.

Analysis:
 Titrimetric monosubstituted amide—92.5%
 Iodine value—0.7

GLPC analysis:
 Amide—99%
 Other—1%

TLC analysis:
 Amide—99%

EXAMPLE XV

An autoclave was charged with 120 gms. (6.0 moles) liquid hydrogen fluoride at about 0° C. To this was added a solution of 38.5 gms. (0.938 mole) acetonitrile and 8.65 gms. (0.48 mole) water. The unit was closed and temperature raised to about 48° C. Then 32.9 gms. (0.40 mole) cyclohexene was pumped into the reactor over a period of about 30 minutes. Stirring was continued for an additional 30 minutes at about 50° C., the unit cooled to about 5° C. and opened. The reaction mixture was poured into cold water, ether added, the organic phase separated, washed, dried, and concentrated resulting in a white solid having an uncorrected melting point of 106.5–108° C. The reported melting point for N-cyclohexyl acetamide is 104° C. The mass yield was 57% and the amount of amide was 96.2%. Gas chromatographic analysis showed a single peak other than the solvent peak.

EXAMPLE XVI

A 300 ml. stirred, Monel autoclave was charged with 120.0 gms. (1.2 mole) of acetonitrile and 8.65 gms. (0.48 mole) of water at about 0° C. The autoclave was closed and the temperature raised to 50° C. Alpha-pinene (54.5 gms., 0.4 mole) was added over a 40-minute period at 50–55° C. Stirring was continued for an additional 30 minutes at 50–55° C. The unit was then cooled to about 0–10° C. and opened. The reaction mixture was worked up as in Example XI to yield 31.1 gms. (39.9% crude mass yield) of a viscous syrup.

Analysis:
 Titrimetric monosubstituted amide—40.1%
 Iodine value—25.0

TLC analysis:
 Amide—40%
 Other—60%

EXAMPLE XVII

Commercially available $C_7$–$C_8$ olefins described as random, internal linear olefins were analyzed to have the following components:

| Carbon Number: | Weight percent linear olefins | Weight percent branched olefins |
|---|---|---|
| $C_6$ plus lighter | 0.61 | |
| $C_7$ | 70.26 | 0.46 |
| $C_8$ | 28.0 | 0.55 |
| $C_9$ | 0.10 | 0.02 |
| Saturates, 0.15% | | |

A one-liter Parr autoclave was charged with 2.0 moles of the above described $C_7$–$C_8$ olefin, 2.25 moles of acetonitrile and 2.4 moles of water, and the system purged with nitrogen. The reaction mixture was heated to 60° C. and 18 moles of anhydrous hydrogen fluoride was pumped in at 60–90° C. over one-half hour. The mixture was allowed to stir for an additional 30 minutes and then added to cold water. The organic phase was washed three times with water, then with dilute potassium carbonate until the washings were neutral. The crude amide was isolated as an oil (89%) having the following analysis: Mono-substituted amide, 91%, and moisture, 4.7%.

A one-liter Monel Parr autoclave was charged with 58.5 gms. of sodium hydroxide, 21.9 of water, 234 gms. of methanol and 196 gms. of N-($C_7$–$C_8$ alkyl) acetamide produced above. The temperature was raised to 195–205° C. (385–460 p.s.i.g.) for four hours. The reaction mixture was then cooled, diluted with water, and the crude amine separated by steam distillation. The organic phase was separated (216 gms.) and the isomer distribution determined by gas chromatography.

| Isomer N-position: | $C_7$ (61.7%) | $C_8$ (24.1%) | $C_x$ (14.2%) |
|---|---|---|---|
| 2- | 19.9% | 14.7% | |
| 3- | 49.3% | 38.0% | |
| 4- | 20.8% | 42.0% | |
| Unknown | 10.0% | 5.3% | |

The amine contained approximately 30% water.

EXAMPLE XVIII

A Monel autoclave was charged with 100 gms. (5.0 moles) hydrogen fluoride, 24.6 gms. (0.60 mole) acetonitrile, and 4.32 gms. (0.24 mole) water at approximately 0° C. The unit was closed and the temperature raised to about 49° C. Then 56.1 gms. (0.20 mole) oleic acid was pumped into the reactor over a period of about 33 minutes at 49–56° C. Stirring was continued for an additional 25 minutes at about 56–59° C. The reaction mixture was then cooled to 10° C., autoclave opened, contents poured into cold water, and ether added. The organic phase was separated, washed, dried and concentrated resulting in a dark viscous oil product (92.1% yield) having the following properties:

Iodine value—5.87
Neutralization equivalent:
  Experimental—334
  Calculated—341.5

Acetamidostearic acid—98.0%

Acetamidostearic acid was determined both by perchloric acid titration of the amide function and potassium hydroxide titration of the acid function.

EXAMPLE XIX

A 300 ml. stirred, Monel autoclave was charged with 100 gms. (5.0 moles) of liquid hydrogen fluoride, 41.0 gms. (1.0 mole) of acetonitrile and 7.22 gms. (0.4 mole) of water at 0–5° C. The autoclave was closed and the temperature raised to 50° C. Oleyl nitrile (87.8 gms., 0.33 mole) was added over a 40-minute period at 50–55° C. Stirring was continued for an additional 30 minutes at 50–55° C. The unit was then cooled to about 0–10° C. and opened. The reaction mixture was worked up as in Example XI to yield 96.2 gms. (89.5% crude mass yield) of a light amber oil.

Analysis:
  Titrimetric monosubstituted amide—90.0%
  Iodine value—13.0
TLC analysis:
  Amide—80%
  Unreacted nitrile—15%
  Other—5%
GLPC analysis:
  Amide—85%
  Unreacted nitrile—15%

EXAMPLE XX

An autoclave was charged with 100 gms. (5.0 moles) hydrogen fluoride, 4.32 gms. (0.24 mole) water, and 24.6 gms. (0.60 mole) acetonitrile at approximately 0° C. The vessel was closed and temperature raised to about 46° C. Then 53.4 gms. (0.20 mole) oleyl amine was added to the reactor over a period of about 40 minutes. Stirring was continued for an additional 30 minutes at 50–55° C. The reaction mixture was cooled to about 10° C., the reactor opened, and the contents poured into a stainless steel beaker. The bulk of the hydrogen fluoride was removed with stirring and heating at 18° to 102° C. for a period of about 55 minutes. The product was then poured into 1000 ml. of water resulting in a homogeneous solution. 157 gms. (2.8 moles) potassium hydroxide was added resulting in the formation of an oily layer which was separated. This product was extracted with 1000 ml. of ether. A large insoluble interface between the aqueous layer and ether was discarded. The ether solution was washed, dried, and concentrated, resulting in an 82.5% yield of a dark oil having the following properties: Percent amide, 99.0, and iodine value, 6.2.

EXAMPLE XXI

A 300 ml. stirred, Monel autoclave was charged with 120.0 gms. (6.0 moles) of liquid hydrogen fluoride, 49.2 gms. (1.2 moles) of acetonitrile and 8.65 gms. (0.48 mole) of water at 0–5° C. The autoclave was closed and the temperature raised to 50° C. 1,7-octadiene (22.0 gms., 0.2 mole) was added over a 30 minute period at 50–55° C. Stirring was continued for an additional 30 minutes at 50–55° C. The unit was then cooled at 0–10° C. and opened. The reaction mixture was worked up as in Example XI to yield 7.9 gms. (17.5% crude mass yield) of oil.

Analysis:
  Titrimetric amide—(51.3% calculated as diamide or 76.0% calculated as monoamide)
  Iodine value—21.8

TLC analysis:
  Monoamide—80%
  Diamide—15%
  Other—5%
GLPC analysis:
  Monoamide—71.5%
  Diamide—20.4%
  Other—8.1%

EXAMPLE XXII

A reactor was charged with 80 gms. (4.0 moles) hydrogen fluoride, 24.5 gms. (0.905 mole) hydrogen cyanide and 10.8 gms. (0.60 mole) of water at −10° C. The reactor was closed and temperature brought to 20° C. Then 89.5 gms. (0.50 mole) of $C_{11}$–$C_{15}$ alpha-olefin, having properties as described in Example V, were pumped into the reactor at a temperature of 20 to 40° C. over a period of 60 minutes. Stirring was continued for an additional 60 minutes at 22 to 38° C. The reaction mixture was cooled to −10° C. and poured into 1500 ml. of cold water. The product was ether extracted and the extract washed twice with water, once with a dilute sodium hydroxide solution, and twice with salt water. The ether-amide solution was dried over anhydrous sodium sulfate. The drying agent was filtered off and concentration in vacuo gave 91.7% yield of product having the following properties:

Percent amide—82.4
Nitrogen (percent)—calculated, 6.24; experimental 5.67
Iodine value—calculated, 0.0; experimental 9.34

The N-($C_{11}$–$C_{15}$ sec-alkyl) formamide was hydrolyzed in alcoholic sodium methoxide. The reactants were refluxed for about 79 hours at 79° C. The solvent was removed by vacuum and the residue added to water and ether extracted. The resulting amine gave the following isomer distribution within the $C_{13}$ chain by gas chromatography:

| Amine position: | Percent |
|---|---|
| 2 | 9.5 |
| 3 | 25.0 |
| 4 | 30.0 |
| 5+ | 35.5 |

EXAMPLE XXIII

The reaction was carried out as in Example XXII except that the total reaction time was 142 minutes and 5 moles of hydrogen fluoride were used. At the end of the reaction, the mixture was transferred to a stainless steel beaker. The contents were heated to 40–170° C. for 5 hours with stirring. The product was obtained in essentially quantitative yield and had the following properties:

Percent amide—78.3
Nitrogen (percent)—calculated, 6.24; experimental 6.46
Iodine value—calculated, 0.0; experimental 3.3.

EXAMPLE XXIV

A reactor was charged with 54 gms. (0.30 mole) $C_{11}$–$C_{15}$ alpha-olefin, having properties as described in Example V. The reactor was closed and 24.3 gms. (0.90 mole) hydrogen cyanide and a solution of 90 gms. (4.50 moles) hydrogen fluoride and 6.48 gms. (0.36 mole) water were introduced simultaneously through two pumps over a period of about 44 minutes and at 45–50° C. The hydrogen cyanide was pumped directly into the olefin and the hydrogen fluoride-water was pumped into the free space above the liquid. Stirring was continued for about 30 minutes at about 50° C., the mixture cooled to about 0° C., the reactor opened, and the reaction mixture divided into two portions: (1) 48.2% was processed further by driving the hydrogen fluoride off by heating, and (2) 51.8% was worked up by water treatment and extraction of the product, N-($C_{11}$–$C_{15}$ sec-alkyl) formamide.

(1) Heat treatment

A portion of the reaction product was heated with stirring at 10–170° C. for about 30 minutes and then 80–170° C. for an additional 15 minutes. At this point, 0.83 mole hydrogen fluoride was present per-mole amide expected. Heating with stirring was continued for about 12 minutes at 45–200° C. at the end of which 98.4% yield of a dark, viscous oil was obtained. The crude product was poured into water, ether extracted, washed dried and concentrated giving a dark oil product in 86.5% yield and having the following properties: Percent amide, 90.3, and Iodine value, 2.2.

Isomer distillation by gas chromatography:

| Position of amide | Percent | | | | |
|---|---|---|---|---|---|
| | $C_{11}$ | $C_{12}$ | $C_{13}$ | $C_{14}$ | $C_{15}$ |
| 2 | 23.4 | 21.9 | 23.3 | 22.9 | 19.5 |
| 3 | 29.1 | 30.7 | 28.3 | 27.5 | 26.8 |
| 4 | 47.5(4+) | 47.4(4+) | 17.2 | 18.5 | 20.8 |
| 5 | | | 31.2(5+) | 31.1(5+) | 12.0 |
| 6+ | | | | | 20.9 |

(2) Water treatment

A portion of the reaction product was poured into water, ether extracted, washed, dried and concentrated giving a yellow oil product in 94.9% yield and having the following properties: Percent amide, 85.6, and iodine value, 4.08.

Isomer distribution by gas chromatography:

| Position of amide | Percent | | | | |
|---|---|---|---|---|---|
| | $C_{11}$ | $C_{12}$ | $C_{13}$ | $C_{14}$ | $C_{15}$ |
| 2 | 25.5 | 21.8 | 25.9 | 22.2 | 19.7 |
| 3 | 28.1 | 27.9 | 27.2 | 26.9 | 26.2 |
| 4 | 46.4(4+) | 50.3(4+) | 15.2 | 17.9 | 19.6 |
| 5 | | | 31.7(5+) | 32.9(5+) | 12.4 |
| 6+ | | | | | 22.1 |

EXAMPLE XXV

A 300 ml. stirred, Monel autoclave was charged with 60 gms. (3.0 moles) of liquid hydrogen fluoride, 4.32 gms. (0.24 mole) of water and 75.0 gms. (0.6 mole) of caprylonitrile. The autoclave was closed and the temperature raised to 45° C. Dodecene-1 (33.6 gms., 0.2 mole) was added over a 15 minute period at 45–50° C. Stirring was continued for an additional 30 minutes at 45–50° C. The unit was then cooled to about 0° C. and opened. The reaction mixture was worked up as in Example XI to yield 109.0 gms. of a dark amber oil containing the excess caprylonitrile (99% crude mass yield) 112.5 gms. theoretical including the excess nitrile.

Analysis:
Titrimetric monosubstituted amide 53.5% (calc'd 55.4% due to 2 mole excess nitrile still in product)
Iodine value—5.4
Acid value—8.58
TLC analysis:
Amide—60–65%
Nitrile—30–35%
Other—5%
GLPC analysis:
Amide—49.2% (calc'd 55.4%)
Nitrile—46.8% (calc'd 44.6%)
Other—4%

EXAMPLE XXVI

A 300 ml. stirred, Monel autoclave was charged with 90.0 gms. (4.5 moles) of liquid hydrogen fluoride, 6.48 gms. (0.36 mole) of water and 47.7 gms. (0.9 mole) of acrylonitrile at about 0° C. The autoclave was closed and the temperature raised to 47° C. Dodecene-1 (50.5 gms., 0.3 mole) was added over a 26 minute period at 47–57° C. Stirring was continued for an additional 30 minutes at 45–53° C. The unit was then cooled to about 0–5° C. and opened. The reaction mixture was worked up as in Example XI to yield 67.5 gms. (94.2% crude mass yield) of pale amber oil.

Analysis:
Titrimetric monosubstituted amide—93.2%
Iodine value—3.04
GLPC analysis:
Amide—93.9%
Olefin—6.1%
TLC analysis:
Amide—about 95%

Example XXVII

A 300 ml. stirred, Monel autoclave was charged with 90.0 gms. (4.5 moles) of liquid hydrogen fluoride and 6.48 gms. (0.36 mole) of water at —10° C. The autoclave was closed and the temperature raised to 45° C. A solution of dodecene-1 (50.5 gms. 0.3 mole) in benzonitrile (38.8 gms., 0.375 mole) was then added over a 65 minute period at 45–56° C. The stirring was continued for an additional 13 minutes and the reaction mixture cooled to about 0° C. and opened. The reaction mixture was worked up as in Example XI to yield 67.7 gms. (77.5% crude mass yield) of dark viscous oil.

Analysis:
Titrimetric monosubstituted amide—40.5%

EXAMPLE XXVIII

A 300 ml. stirred, Monel autoclave was charged with 60.0 gms. (3.0 moles) of liquid hydrogen fluoride and 4.32 gms. (0.24 mole) of water at 0–5° C. The autoclave was closed and the temperature raised to 23° C. Addition of dodecene-1 and cyanogen gas was started at the same time. Addition of both was completed in 27 minutes at 23–26° C. Stirring was continued for an additional 43 minutes while the temperature was gradually raised from 23° C. to 65° C. The unit was then cooled to 0–5° C. and opened. The reaction mixture was worked up as in Example XI to yield 41.9 gms., 99% crude mass yield based on

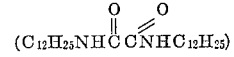

of a soft brown solid.

Analysis:
Titrimetric monosubstituted amide—41% as

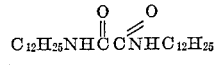

Amine—9.2%
Iodine value—5.73
GLPC analysis:
Amide—43.5%

Extraction of the brown solid with petroleum ether separated the product into two phases. The petroleum ether soluble portion was a viscous, amber oil which constituted about 60% of the crude product. Infrared analysis identified this product as primarily the disubstituted oxamide.

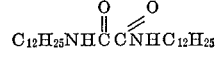

The petroleum ether insoluble portion was an off-white solid melting at 126–128° C., constituting about 40% of the crude product and identified by infrared analysis as primarily the monosubstituted oxamide.

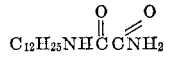

Example XXIX

A 300 ml. stirred, Monel autoclave was charged with 50 gms. (2.5 moles) of liquid hydrogen fluoride and 3.60 gms. (0.2 mole) of water at 0–5° C. The autoclave was closed and the temperature raised to 20° C. A solution of 21 gms. (0.5 mole) of cyanamide and 49.4 gms. (0.166 mole) of methyl oleate in about 70 ml. of ethyl acetate was pumped in over a period of 30 minutes at 20–22° C. Stirring was continued for 60 minutes at 25–30° C. The unit was then cooled to 0° C. and opened. The reaction mixture was worked up as in Example XI to yield 47.2 gms. (79.4% crude mass yield) of oil.

Analysis:
  Titrimetric monosubstituted urea—16.7%
  Iodine value—55.0
  Acid value—10.9

Example XXX

A 300 ml. stirred, Monel autoclave was charged with 120.0 gms. (6.0 moles) of liquid hydrogen fluoride and 8.63 gms. (0.48 mole) of water at about 0° C. The autoclave was closed and the temperature was raised to 50° C. Oleyl nitrile (105.4 gms., 0.4 mole) was added over a 51 minute period at 45–55° C. The stirring was continued for an additional 30 minutes at 45–50° C. The unit was then cooled to about 20° C., opened, and the reaction mixture poured into 1000 ml. of cold water. Ether (1000 ml.) was added and the acidic aqueous layer separated. The ether layer was washed once with salt solution and once with dilute potassium hydroxide whereupon an emulsion layer formed which was separated. The ether layer was then washed twice more with salt solution and dried over anhydrous sodium sulfate. The emulsion layer was acidified with concentrated HCl and the resulting oil was extracted with ether. The ether extract was washed four times with salt solution, dried over anhydrous sodium sulfate and combined with the previous ether extract. The combined ether solutions were then stripped under reduced pressure to yield 94.6 gms. (84.0% crude mass yield) of viscous, dark amber oil.

Analysis:
  Titrimetric monosubstituted amide—59.7%
  Iodine value—30.9

EXAMPLE XXXI

A 300 ml. stirred, Monel autoclave was charged with 60.0 gms. (3.0 moles) of liquid hydrogen fluoride, 4.32 gms. (0.24 mole) of water and 10.6 gms. (0.2 mole) of acrylonitrile at about 0° C. The autoclave was closed and the temperature raised to 50° C. Oleyl nitrile (52.7 gms., 0.2 mole) was added over a 30-minute period at 45–50° C. Stirring was continued for an additional 30 minutes at 45–50° C. The unit was cooled to 0–5° C., opened, and the reaction mixture poured into 1000 ml. of cold water. Ether (1000 ml.) was added, the acidic aqueous layer separated and the ether layer washed nine times with salt solution. The ether solution was dried over anhydrous sodium sulfate and stripped under reduced pressure to yield 59.8 gms. (89.3% crude mass yield) of viscous, dark amber oil.

Analysis:
  Titrimetric monosubstituted amide—85.0%
  Iodine value—34.2
  TLC analysis:
    Amide—85%
    Nitrile—10%
    Other—5%

EXAMPLE XXXII

The same reactants as in Example XXXI were run under the same conditions as Example XXXI except that 3 moles of acrylonitrile per mole of oleyl nitrile were used to yield 62.5 gms. (93.4% crude mass yield) of viscous amber oil.

Analysis:
  Titrimetric monosubstituted amide—76.6%
  Iodine value—21.8
  TLC analysis:
    Amide—78%
    Nitrile—15%
    Other—7%

While in the foregoing specification this invention has been described in relation to certain preferred embodiments thereof, and many details have been set forth for purpose of illustration, it will be apparent to those skilled in the art that the invention is susceptible to additional embodiments and that certain of the details herein can be varied considerably without departing from the basis principles of the invention.

We claim:

1. A process for preparing N-monosubstituted secondary-alkyl amides, comprising reacting an aliphatic olefin with a nitrile and water in the presence of hydrogen fluoride, said hydrogen fluoride present in a mole ratio of hydrogen fluoride to olefin of greater than about 3.

2. The process of claim 1 wherein the mole ratio of nitrile to olefin is from about 1.1 to 4.

3. The process of claim 1 wherein the mole ratio of hydrogen fluoride to olefin is from about 8 to 25.

4. The process of claim 1 wherein the mole ratio of water to olefin is in excess of about 1.0.

5. The process of claim 1 wherein the mole ratio of water to olefin is from about 1.0 to 1.3.

6. The process of claim 1 wherein the temperature during the olefin-nitrile-water reaction is from about −20° C. to 100° C.

7. The process of claim 1 wherein the temperature during the olefin-nitrile-water reaction is from about 25° to 60° C.

8. The process of claim 1 wherein said olefin has the structure

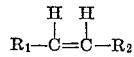

wherein $R_1$ is selected from the group consisting of hydrogen and an aliphatic hydrocarbon radical, $R_2$ is an aliphatic radical which may be connected to $R_1$ in a cyclic structure, and wherein the total molecule contains from 3 to about 48 carbon atoms.

9. The process of claim 8 wherein $R_2$ is selected from the group consisting of alkyl $C_{1-22}$ and alkenyl $C_{3-22}$ provided that the alkenyl unsaturation is not conjugated to the olefinic function.

10. The process of claim 9 wherein $R_2$ is an alkyl group having from 1 to 22 carbon atoms and is substituted with a radical selected from the group consisting of amino, carboxy and cyano.

11. The process of claim 1 wherein said olefin is an alpha-olefin.

12. The process of claim 1 wherein said olefin is an internal olefin.

13. The process of claim 1 wherein said olefin has the structure

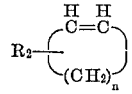

wherein $n$ is an integer from 1 to about 10.

14. The process of claim 1 wherein said olefin is a diolefin.

15. The process of claim 1 wherein said nitrile has the structure $R'C \equiv N$ and $R'$ is selected from the group consisting of hydrogen, an aliphatic hydrocarbon radical having from 1 to about 21 carbon atoms, an aryl radical an amino radical, a cyano radical, and metallic salts of an amino radical.

16. The process of claim 1 wherein said nitrile is $HC \equiv N$.

17. The process of claim 1 wherein said nitrile is an aromatic nitrile.

18. The process of claim 1 wherein said nitrile is a dinitrile.

19. The process of claim 1 wherein said nitrile is an amino nitrile.

20. The process of claim 1 wherein said nitrile is an olefinic unsaturated aliphatic nitrile having from 3 to about 21 carbon atoms.

21. A process for preparing an isomeric mixture of N-monosubstituted secondary-alkyl amides from aliphatic olefins, said mixture being rich in isomers wherein the point of attachment of the nitrogen atom is removed from the site of the original location of the double bond in the olefin molecule, comprising mixing a nitrile, water and hydrogen fluoride, then adding an olefin to said mixture, and subjecting said mixture to reaction conditions.

22. A process for preparing an isomeric mixture of N-monosubstituted secondary-alkyl amides from aliphatic olefins, said mixture being rich in isomers wherein the point of attachment of the nitrogen atom is at and adjacent to the site of the original location of the double bond in the olefin molecule, comprising mixing a nitrile, water, hydrogen fluoride, and an olefin, said olefin being added prior to the last reactant, and subjecting said mixture to reaction conditions.

23. A process for preparing N-monosubstituted secondary-alkyl amides, comprising reacting an aliphatic alpha-olefin with an aliphatic nitrile and water in the presence of hydrogen fluoride; wherein the mole ratio of nitrile to olefin is from about 1.1 to 4, water to olefin is from about 1.0 to 1.3, hydrogen fluoride to olefin is from about 8 to 25; and wherein the temperature during said reaction is from about 25° to 60° C.

References Cited

UNITED STATES PATENTS

| | | | |
|---|---|---|---|
| 2,573,673 | 10/1951 | Ritter | 260—404 |
| 2,719,176 | 9/1955 | Coover et al. | 260—561 |
| 2,820,801 | 1/1958 | Benneville et al. | 260—404 |
| 3,190,882 | 6/1965 | Schaeffer | 260—561 |
| 3,338,967 | 8/1967 | Potts et al. | 260—583 |

LEWIS GOTTS, Primary Examiner

D. E. RIVERS, Assistant Examiner

U.S. Cl. X.R.

260—404.5, 553, 558, 561